UNITED STATES PATENT OFFICE.

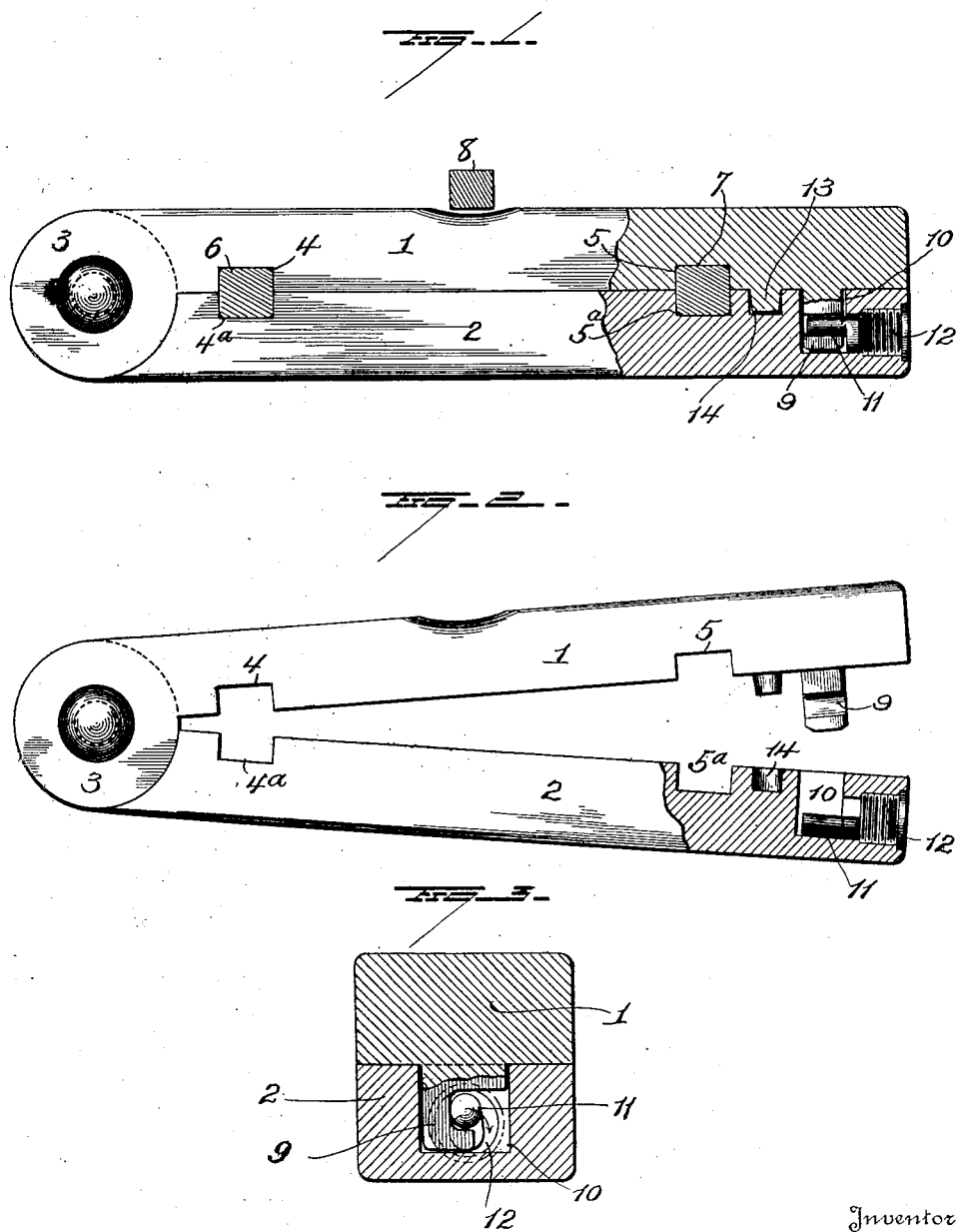

DAVID M. TILLER, OF BROKEN ARROW, OKLAHOMA, ASSIGNOR OF ONE-EIGHTH TO J. ROBERT HALL, ONE-EIGHTH TO C. BURCKHARTT TALBOT, AND ONE-EIGHTH TO SYLVESTER P. HAZEN, ALL OF BROKEN ARROW, OKLAHOMA.

LOCKING DEVICE FOR MOTOR-VEHICLES.

1,386,543.     Specification of Letters Patent.     Patented Aug. 2, 1921.

Application filed April 1, 1920. Serial No. 370,451.

*To all whom it may concern:*

Be it known that I, DAVID M. TILLER, a citizen of the United States, and a resident of Broken Arrow, in the county of Tulsa and State of Oklahoma, have invented certain new and useful Improvements in Locking Devices for Motor-Vehicles; and I do hereby declare the following to be a full, clear, and exact description of the invention, such as will enable others skilled in the art to which it appertains to make and use the same.

This invention relates to improvements in locking devices for motor vehicles and more particularly to pedal-locking means for a Ford car,—one object of the invention being to provide simple and efficient means whereby the several pedals may be held immovable, with the clutch and reverse pedals both held in operative position and the clutch and brake pedals connected together and held immovable relatively to each other, whereby the vehicle cannot be operated to move either forwardly or backwardly.

With this and other objects in view the invention consists in certain novel features of construction and combinations of parts as hereinafter set forth and pointed out in the claims.

In the accompanying drawings, Figure 1 is a view partly in elevation and partly in section showing an application of my invention to lock the several pedals against movement. Fig. 2 is a view in elevation, partly in section showing the device open, and Fig. 3 is a transverse sectional view with the parts in the operative position shown in Fig. 1.

My improved pedal-locking means comprises two bars or members 1 and 2 connected together at one end by means of a hinge 3 and adapted, when in operative position, to lie one against the other. The member 1 is made with recesses 4, 5, and the member 2 is likewise provided with recesses 4ª and 5ª. The recesses 4 and 4ª in the respective members 1 and 2 coöperate to receive the clutch pedal lever 6 and the recesses 5 and 5ª similarly coöperate to receive the brake pedal lever 7 as these levers are arranged in a Ford car, so that when the members 1 and 2 are in the position shown in Fig. 1 and located together as hereinafter described, they will be held securely against movement and will be locked together. The reverse pedal lever 8 will be moved forwardly to operative position and will occupy a position in front of the bar or member 1 and be held by the latter against rearward movement.

One of the bar members, preferably the member 1, is provided with a keeper 9 and the bar member 2 is formed with a recess 10 into which the keeper 9 projects so as to be in position to receive a locking bolt 11 disposed in said recess. The bar member 2 is provided in its free end with a threaded socket to receive a lock 12 which is preferably of the pin tumbler or permutation type, and this lock is suitably connected with the bolt 11 so that the latter is operable only by means of a key. In order that the bar members may be brought accurately together, one of them is provided with a pin 13 to engage in a socket 14 in the other bar member.

It will be observed that with my improvements, the several pedal levers will be so locked against movement that the clutch lever will will be in position for forward movement of the car and that at the same time the reverse lever will be in position for backward movement of the car, thus preventing possibility of moving the car in either direction or of operating any one of the pedal levers. It will also be observed that the locking means for the bar members are wholly concealed and that they can be manipulated only with the use of a proper key.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:

1. Pedal locking means for motor vehicles comprising two approximately straight members of substantially the same length hinged together at one end, having pockets to receive respectively the clutch and brake pedals and prevent independent movement of either, the lock as a whole adapted to pass behind the reverse pedal and hold it in forward position, one of said members provided on its inner face adjacent its free end with a lock housed therein, and the other member provided on its inner face near its free end with a keeper to be engaged by the bolt of the lock for locking the two members together.

2. Pedal locking means for a motor vehicle comprising two approximately straight members of substantially the same length hinged together at one end and having two pockets to receive respectively the clutch and brake pedals and prevent independent movement of either, the lock as a whole adapted to pass behind the reverse pedal and hold it in its forward or operative position, one of said members being provided on its inner face with a socket to receive a projection on the other member and one of said members being provided adjacent its free end with a keeper, and a lock in the other member, the bolt of which is adapted to engage the keeper for locking the two members together.

In testimony whereof, I have signed this specification in the presence of two subscribing witnesses.

DAVID M. TILLER.

Witnesses:
F. S. HURD,
CHAS. C. FOSTER.